(12) United States Patent
Dhua et al.

(10) Patent No.: US 11,521,376 B1
(45) Date of Patent: Dec. 6, 2022

(54) THREE-DIMENSIONAL ROOM ANALYSIS WITH AUDIO INPUT

(71) Applicant: A9.com, Inc., Palo Alto, CA (US)

(72) Inventors: Arnab Dhua, Cupertino, CA (US); Divyansh Agarwal, Sunnyvale, CA (US)

(73) Assignee: A9.com, Inc., Pato Alto, CA (US)

( * ) Notice: Subject to any disclaimer, the term of this patent is extended or adjusted under 35 U.S.C. 154(b) by 0 days.

(21) Appl. No.: 17/449,049

(22) Filed: Sep. 27, 2021

(51) Int. Cl.
*G06V 20/10* (2022.01)
*G10L 15/08* (2006.01)
*G06T 17/00* (2006.01)
*G06T 7/70* (2017.01)
*G06T 19/20* (2011.01)
*G06F 16/432* (2019.01)
*G10L 15/22* (2006.01)
*G06V 20/40* (2022.01)
*G06V 20/64* (2022.01)

(52) U.S. Cl.
CPC ............ *G06V 20/10* (2022.01); *G06F 16/433* (2019.01); *G06T 7/70* (2017.01); *G06T 17/00* (2013.01); *G06T 19/20* (2013.01); *G06V 20/40* (2022.01); *G06V 20/64* (2022.01); *G10L 15/08* (2013.01); *G10L 15/22* (2013.01); *G06T 2200/04* (2013.01); *G06T 2207/10016* (2013.01); *G06T 2207/10028* (2013.01); *G06T 2219/004* (2013.01); *G06T 2219/2004* (2013.01); *G10L 2015/088* (2013.01)

(58) Field of Classification Search
None
See application file for complete search history.

(56) References Cited

U.S. PATENT DOCUMENTS

| | | | | |
|---|---|---|---|---|
| 2019/0005387 | A1* | 1/2019 | Blayvas | G06N 3/0454 |
| 2020/0279320 | A1* | 9/2020 | Stewart | H04N 21/23614 |
| 2020/0401802 | A1* | 12/2020 | Grant | G06F 16/5866 |

* cited by examiner

*Primary Examiner* — Frank S Chen
(74) *Attorney, Agent, or Firm* — Knobbe, Martens, Olson & Bear, LLP (57) ABSTRACT

System and methods are provided that generate a three-dimensional model from a physical space. While a user is scanning and/or recording the physical space with a user computing device, user speech describing the physical space is recorded. A transcript is generated from the audio captured during the scan and/or image recording of the physical space. Keywords from the transcript are used to improve computer-vision object identification, which is incorporated in the three-dimensional model.

20 Claims, 5 Drawing Sheets

THREE-DIMENSIONAL ROOM ANALYSIS WITH AUDIO INPUT

BACKGROUND

In the augmented reality, virtual reality, virtual modeling, and/or computer vision areas, a user can scan and/or record a physical space with a computing device. For example, a user can scan and/or record a room with a smartphone. A computer process can receive and process the data. For example, the computer process can generate a three-dimensional model from the data. As another example, the computer process can automatically detect and identify objects in the physical space.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

As described above, physical spaces can be scanned and/or recorded, which results in digital representations of physical spaces. A three-dimensional model of the space, such as a room, can be generated from the digital representation. For example, a user may want to design and/or decorate their room. However, a problem with a user scanning and/or recording a physical space is that the user may fail to focus on and/or properly frame objects of interest, such as windows, doors, or staircases, in the space. Another problem with processing digital representations of physical spaces, is that the computer vision algorithms may fail to identify or may fail to correctly identify objects of interest in the digital representations.

Generally described, aspects of the present disclosure are directed to systems and methods that can improve the processing of digital representations of physical spaces and/or the three-dimensional model(s) and output generated from the digital representations. While a user is scanning and/or recording the physical space, an application on the user computing device can prompt the user to speak and describe the physical space. There are advantages to receiving user speech during the scanning and/or recording of the physical space. First, a user may be more likely to frame the object in a reasonable manner if the user is describing something they see on the display. Second, one or more cues from the speech can be used by the computer vision algorithms to more accurately identify objects of interest in the digital representation. For example, the computer vision algorithms can focus on portions of the recorded data based on the speech cues. Also, physical spaces can have lots of objects, so the computer vision algorithms can identify specific objects based on the speech cues instead of identifying every object in a physical space. Third, the one or more cues can be used to annotate the output models. Fourth, the one or more cues can be used recommendation or other purposes. For example, the user can narrate the scan and/or the video and indicate that they would like to replace furniture and/or décor, which can be used by the system.

As described above, some existing computer vision systems can fail to identify one or more objects in a physical space. Correct identification of objects, such as windows, doors, or furniture, with computer vision can be a technically challenging task. For example, existing computer visions systems may use a generic classifier to identify objects and the generic classifier may have difficulty in identifying certain objects, such as windows, doors, staircases, fireplaces, or certain kinds of furniture. In some cases, a generic classifier may inaccurately classify an object. For example, a generic classifier may incorrectly classify an object as a chair (such as a chaise longue) instead of the correct category of a couch depending on the angle of the device during the recording of the input data. In other existing systems, the systems can apply many different classifiers to identify different objects. Accordingly, the systems and methods described herein may improve computer-vision-related technology. As described herein, a transcript can be obtained from audio captured during a scan and/or video recording of the physical space. The systems and methods described herein may identify and use keywords from the transcript to improve computer-vision object identification. In some embodiments, a keyword can indicate which machine learning model(s) the systems and methods describe herein should use. In other embodiments, the keyword(s) can be provided as input to a machine learning model. Thus, the systems and methods described herein may enable more accurate object identification using computer vision. In some embodiments, the systems and methods described herein may lead to faster processing times and/or less usage of computing resources by the computer-vision algorithms. For example, the computer vision algorithms can focus on portions of the recorded data based on the speech cues, which can be faster to process than applying a machine learning model to an entire data set. Also, physical spaces can have lots of objects, so the computer vision algorithms can identify specific objects based on the speech cues instead of identifying every object in a physical space, which can lead to faster processing times. As another example, applying the machine learning model to input data can take time, and, therefore, applying multiple machine learning models can be similarly inefficient. For example, the systems and methods described herein can use the keyword(s) to facilitate the selection of a machine learning model. The process of selecting a machine learning model from multiple models can thus act as a filter, which can enable one or more processors to process the input data much faster than some existing methods to generate the output. In other embodiments, application by the systems and methods described herein to less machine learning models may advantageously result in the use of less computing resources to perform object identification.

As used herein, in addition to its ordinary and customary meaning, the term "digital representation" refers to any computerized data that is represented using discrete values. Discrete units can be extracted from the digital representation that represents a portion of the physical space and can be associated with a timestamp. An example digital representation of a physical space can include a video. A user can record a physical space with a computing device with a camera to generate a video. Discrete units of a video can include frames. Each frame extracted from a video can be associated with a timestamp. Another example digital representation of a physical space can include a point cloud. A user can scan a physical space with a computing device with a lidar sensor to generate a point cloud. Each point from the point cloud can represent the X, Y, and Z geometric coordinates of a single point on an underlying sampled surface. Discrete units of a point cloud can include a point. Each point in a point cloud can be associated with a timestamp. The timestamps described herein can represent when the corresponding recording and/or scanning occurred.

As used herein, in addition to its ordinary and customary meaning, the term "detector" can refer to a machine learning model trained to detect an object in at least a portion of a digital representation of a physical space and create a bounding box in the portion of the digital representation. For example, a detector can both detect an object in an image or point cloud (with a percentage degree of certainty in some embodiments) and create a bounding box in the image or point cloud identifying the object.

As used herein, in addition to its ordinary and customary meaning, the term "segmenter" can refer to a machine learning model trained to output a segmentation mask based on input including at least a portion of a digital representation of a physical space. For example, a segmenter can output a segmentation mask that associates a respective label with a pixel (and potentially associate a respective label with every pixel) from a frame of the portion of the video. If segmenter is trained to receive a point cloud as input, the segmenter can generate a segmentation mask that associates a respective label with a point (and potentially associate a respective label with every point) from the portion of the point cloud.

Figure 1A:
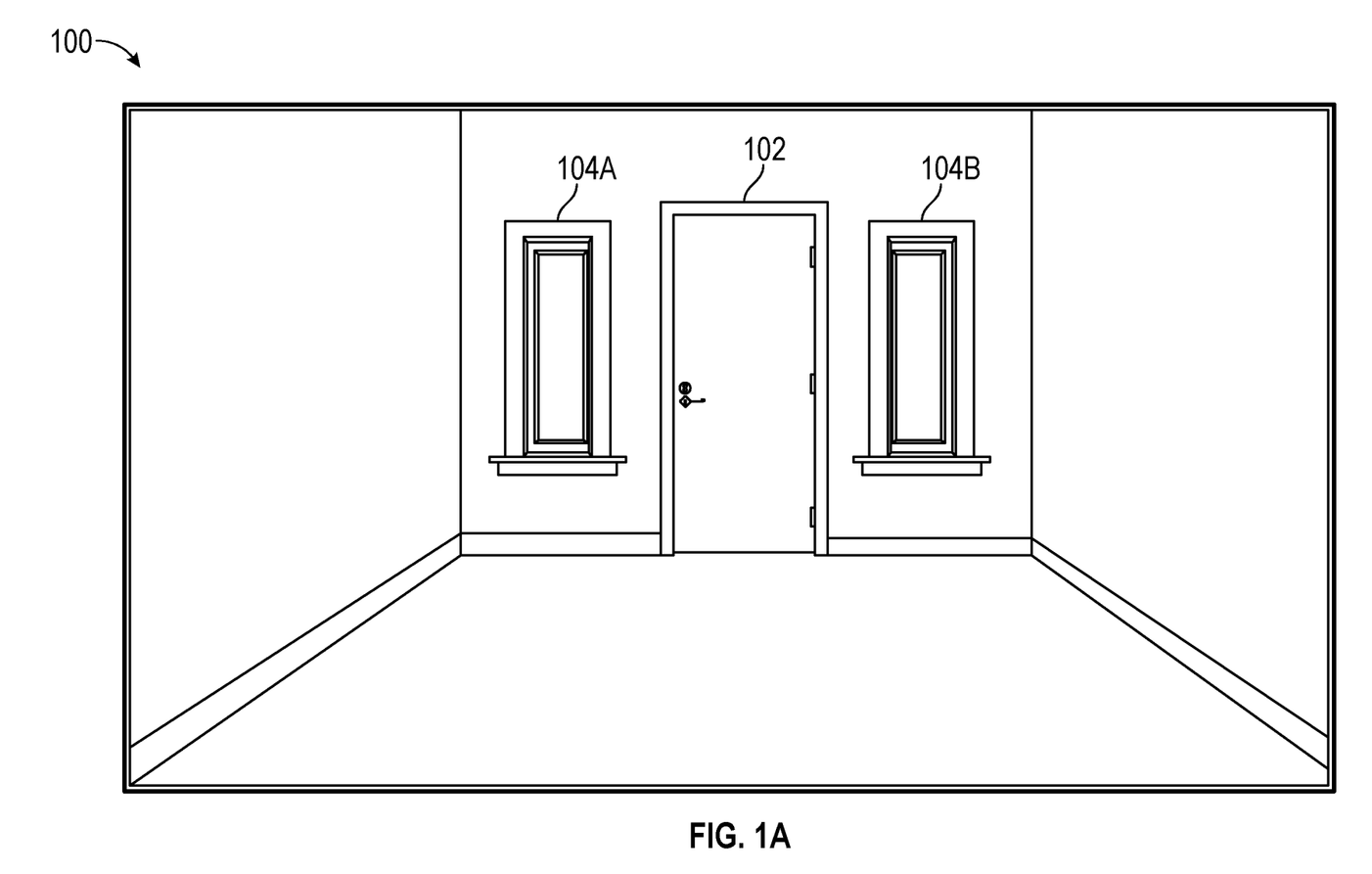
FIG. 1A is a drawing of an example physical space.

FIG. 1A is a drawing of an example physical space 100. The physical space 100 includes a door 102 and windows 104A, 104B. As described herein, a user with a user computing device (not shown) can scan and/or record the physical space 100 that results in a digital representation. The systems and methods described herein can process the digital representation(s) of the physical space 100 to identify the door 102 and/or the windows 104A, 104B.

Figure 1B:
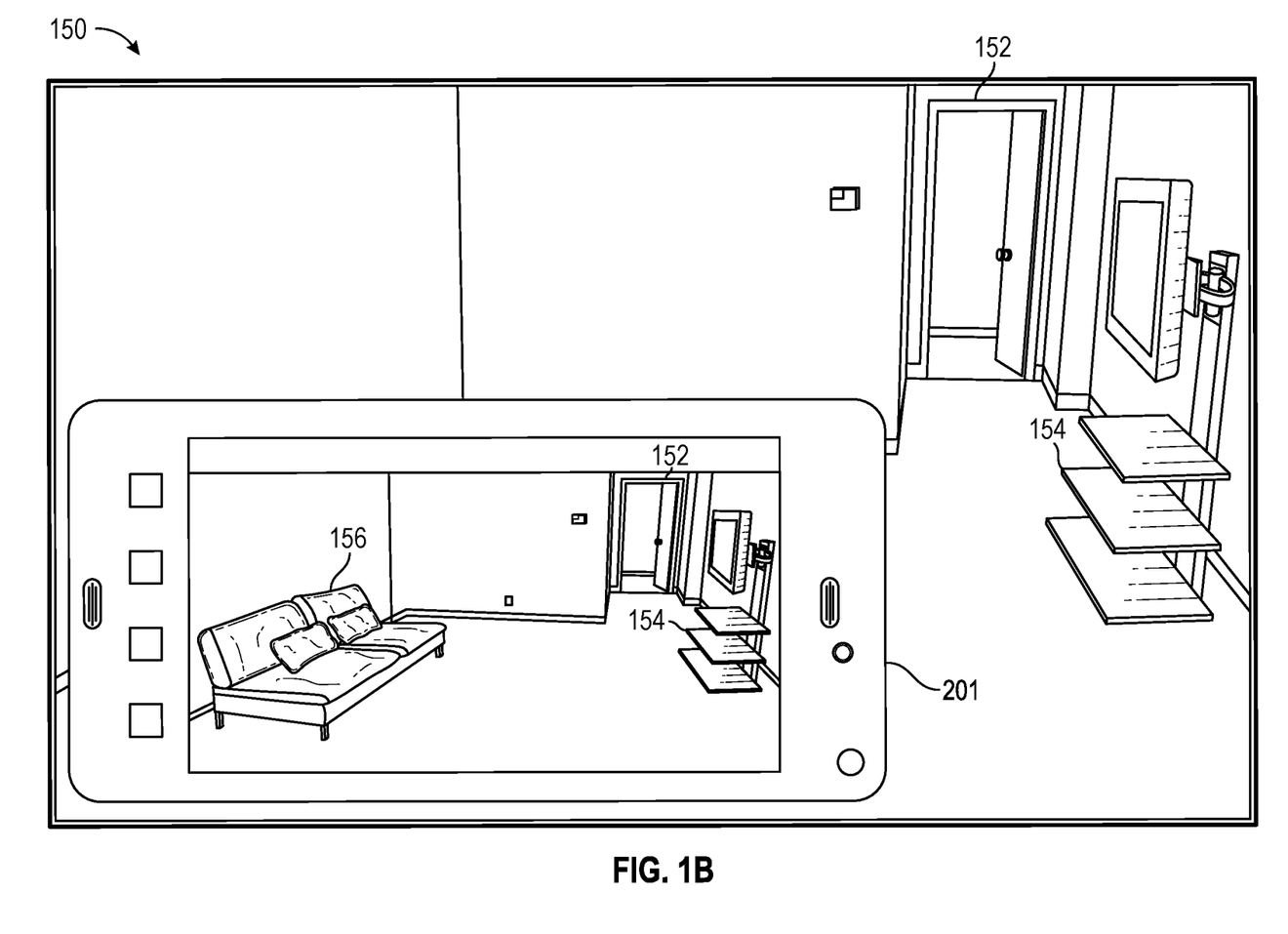
FIG. 1B is a drawing of another example physical space being scanned and/or recorded by a user computing device.

FIG. 1B is a drawing of another example physical space 150 being scanned and/or recorded by a user computing device 102. The physical space 150 includes a door 152 and furniture, such as a television stand 154 with a television and a couch 156. As shown, a user with the user computing device 201 is scanning and/or recording the physical space 150. During the scanning and/or recording process, the application on the user computing device 201 can prompt the user to speak and describe objects in the physical space 150. Some example phrases the user can speak include the following. "This is the door." "This is the television stand, I think I want to keep it." "This is a couch, but it is old and I might consider replacing it in the next few months." "I really like this side table, and I would like whatever couch I buy to match the side table, or to go well with the side table." "I like this lamp." "These are the east facing bay windows in the room, which let in a lot of light." The systems and methods described herein can process the digital representation(s) of the physical space 150 and use user speech to identify the door 152 and/or the furniture, such as a television stand 154 and the couch 156.

Figure 2:
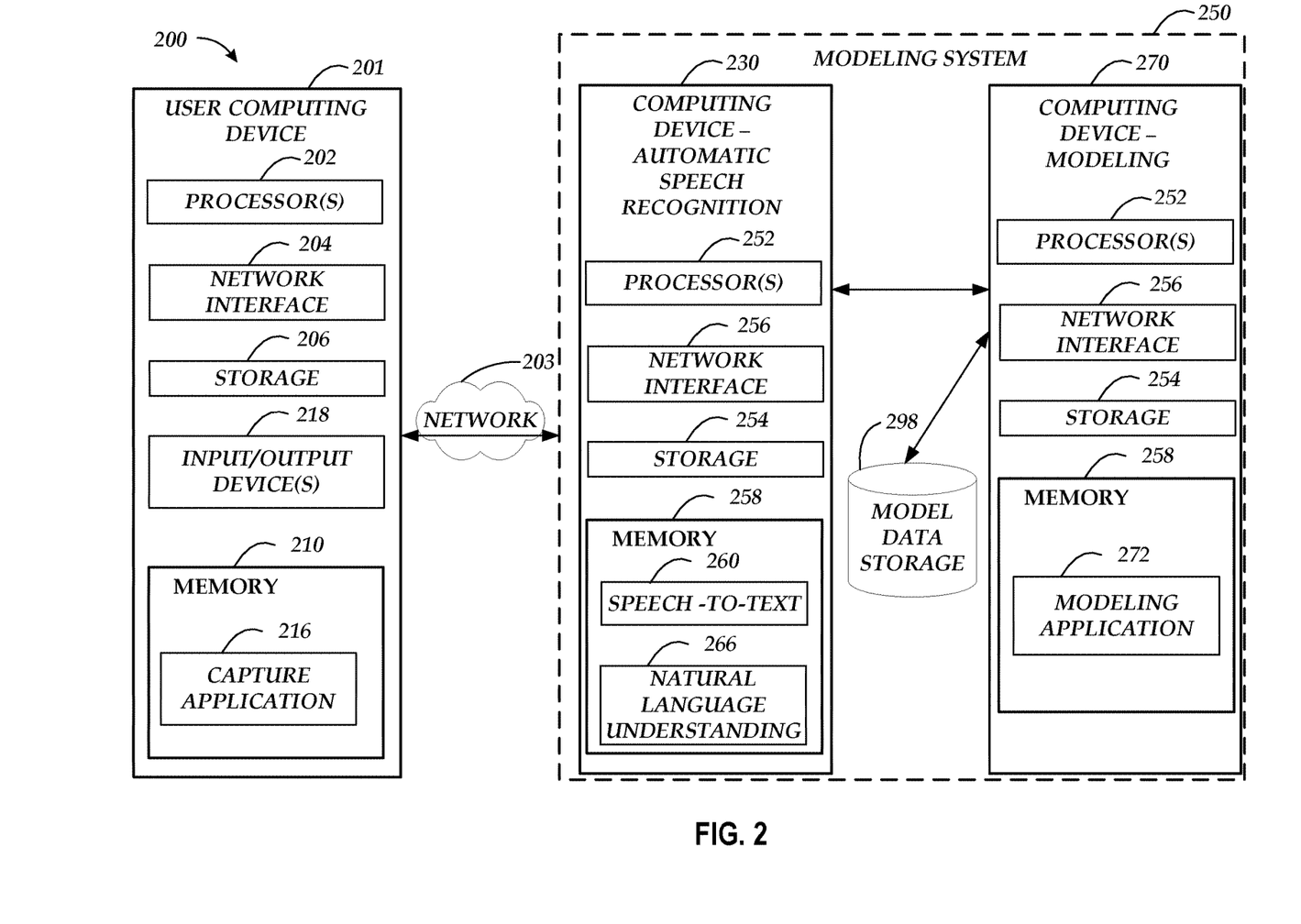
FIG. 2 is a schematic block diagram depicting an illustrative network environment for implementing a modeling system.

Turning to FIG. 2, an illustrative network environment 200 is shown in which a user computing device 201 may communicate with a modeling system 250 over a network 203. While the present disclosure uses the network environment 200 as an example, the techniques described herein for improved processing of digital representation(s) can be applied to other environments. The network environment 100 may include one or more user computing devices 102 and the modeling system 250. The modeling system 250 may include one or more computing devices 230 for automatic speech recognition, a model data storage 298, and one or more computing devices 270 for modeling. The user computing device 201 can execute a capture application 216 that communicates with the modeling system 250.

Example user computing devices 201 can include a laptop or tablet computer, personal digital assistant (PDA), hybrid PDA/mobile phone, smart wearable device (such as a smart watch), mobile phone, and/or a smartphone. The user computing device 102 can interact with the modeling system 104. For example, a user can submit, via the user computing device 201, input data (such as digital representation(s) of the physical space and/or audio data) to the modeling system 250. The modeling system 250 can process the digital representation(s) and/or audio data to generate a three-dimensional model. In particular, the one or more computing devices 230 for automatic speech recognition can process the audio portion of the input data to generate a transcript. The one or more computing devices 270 for modeling can receive the transcript. The one or more computing devices 270 for modeling can process the digital representation(s) with the transcript to generate a three-dimensional model. The one or more computing devices 270 for modeling can apply one or more machine learning models (such as a classifier, a detector, or a segmenter) from the model data storage 298 to identify one or more objects in the three-dimensional model. The machine learning model can be trained to identify and/or locate an object that corresponds to a keyword in a portion of a digital representation of the physical space. The one or more computing devices 270 for modeling can also store the three-dimensional models in the model data storage 298.

The model data storage 298 may be embodied in hard disk drives, solid state memories, any other type of non-transitory computer-readable storage medium. The model data storage 298 may also be distributed or partitioned across multiple local and/or remote storage devices. The model data storage 298 may include a data store. As used herein, in addition to its ordinary and customary meaning, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage.

The network 203 may be any wired network, wireless network, or combination thereof. In addition, the network 203 may be a personal area network, local area network, wide area network, cable network, satellite network, cellular telephone network, or combination thereof. In addition, the network 203 may be a publicly accessible network of linked networks, possibly operated by various distinct parties, such as the Internet. In some embodiments, the network 203 may be a private or semi-private network, such as a corporate or university intranet. The network 203 may include one or more wireless networks, such as a Global System for Mobile Communications (GSM) network, a Code Division Multiple Access (CDMA) network, a Long Term Evolution (LTE) network, or any other type of wireless network. The network 203 can use protocols and components for communicating via the Internet or any of the other aforementioned types of networks, such as HTTP.

A general architecture of the user computing device 201 is shown. Those skilled in the art will appreciate that the user computing device 201 may include more (or fewer) components than those shown in FIG. 2. The user computing device 201 may include a hardware processor 202, a network interface 204, a non-transitory storage 206, memory 210, one or more input/output devices 218, all of which may communicate with one another by way of a communication bus. The network interface 204 may provide the user computing device 201 with connectivity to one or more networks, such as the network 203, or user computing devices. Example output device(s) 218 can include a display, a touch screen, and/or a speaker. The hardware processor 202 may also communicate to and from the memory 210 and further provide output information for the output device 218. Example input/output device(s) 218 can include a camera, a microphone, and/or a lidar sensors. An example lidar sensor emits pulsed light waves into the surrounding environment and the pulses bounce off surrounding objects and return to the sensor.

The memory 210 may contain specifically configured computer program instructions that the hardware processor 202 executes in order to implement one or more embodiments described herein. The memory 210 generally includes RAM, ROM and/or other persistent or non-transitory computer-readable storage media. The memory 210 may store an operating system that provides computer program instructions for use by the hardware processor 202 in the general administration and operation of the user computing device 201. The memory 210 may include a capture application 216 that may be executed by the hardware processor 202. In some embodiments, the capture application 216 may implement various aspects of the present disclosure. For example, the capture application 216 can receive data from the one or more input devices 218. In particular, the capture application 216 can receive data representing the physical space and/or audio data from a microphone. For example, the capture application 216 can receive one or more scans (such as scans generated from a lidar sensor) and/or one or more images from a camera (such as a video).

In some embodiments, the modeling system 250 or components thereof (such as the computing devices 230, 270) are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "serverless," "cloud," or distributed computing environment.

While not illustrated in FIG. 2, in some embodiments, the modeling system 250 may be located within a dedicated computing device instead of being implemented by multiple computing device as shown. In some embodiments, the modeling system 250 and/or aspects or components of the modeling system 250 can be embodied in the user computing device 201. For example, the user computing device 201 can perform some or all of the aspects of automatic speech recognition and/or processing of digital representation(s) of physical spaces.

Each of the one or more computing devices 230, 270 may include one or more processor(s) 252, storage 254, memory 258, and a network interface 256. The processor(s) 252, storage 254, memory 258, and a network interface 256 may, in some embodiments, be substantially similar to the processor(s) 202, storage 206, memory 210, and the memory 210, which are described in greater detail above, and the aforementioned descriptions may apply.

The computing device 230 for automatic speech recognition (ASR) can recognize human speech detected in audio. The memory 258 of the computing device 230 for automatic speech recognition may include a speech-to-text ("STT") component 260 and a natural language understanding ("NLU") component 266 that may be executed by the hardware processor 252. The STT component 260 may transcribe received audio data into text data representing the words of the speech contained in the audio data. The STT component 260 may interpret an utterance based on the similarity between the utterance and pre-established language models stored in an ASR model knowledge base of the storage 254. For example, the input audio data may be compared with models for sounds (e.g., sub-word units or phonemes) and sequences of sounds to identify words that match the sequence of sounds spoken in the utterance of the audio data. The NLU component 266 can determine user meaning, such as user sentiment or intent, based on the detected audio. The NLU component 266 may determine one or more categories to be used by the computing device 270 for modeling processing. For example, words from the speech may indicate an object and/or sentiment about the object, such as the user liking or disliking the object. Output of the NLU component 260 and the STT component 266 can be used by the computing device 270 for modeling.

In some embodiments, sound profiles for different words, phrases, commands, or audio compositions are also capable of being stored within the storage 254, such as within a sound profile database. A sound profile, for example, may correspond to a frequency and temporal decomposition of a particular audio file or audio portion of any media file, such as an audio fingerprint or spectral representation. In other embodiments, the sound profile may be stored in the storage 206 of the user computing device 201.

The memory 258 of the computing device 270 for modeling may include a modeling application 272 that may be executed by the hardware processor 252. In some embodiments, the modeling application 272 may implement various aspects of the present disclosure. For example, the modeling application 272 may process the digital representation(s) with a transcript and/or user meaning to generate a three-dimensional model using the techniques described herein.

Figure 3:
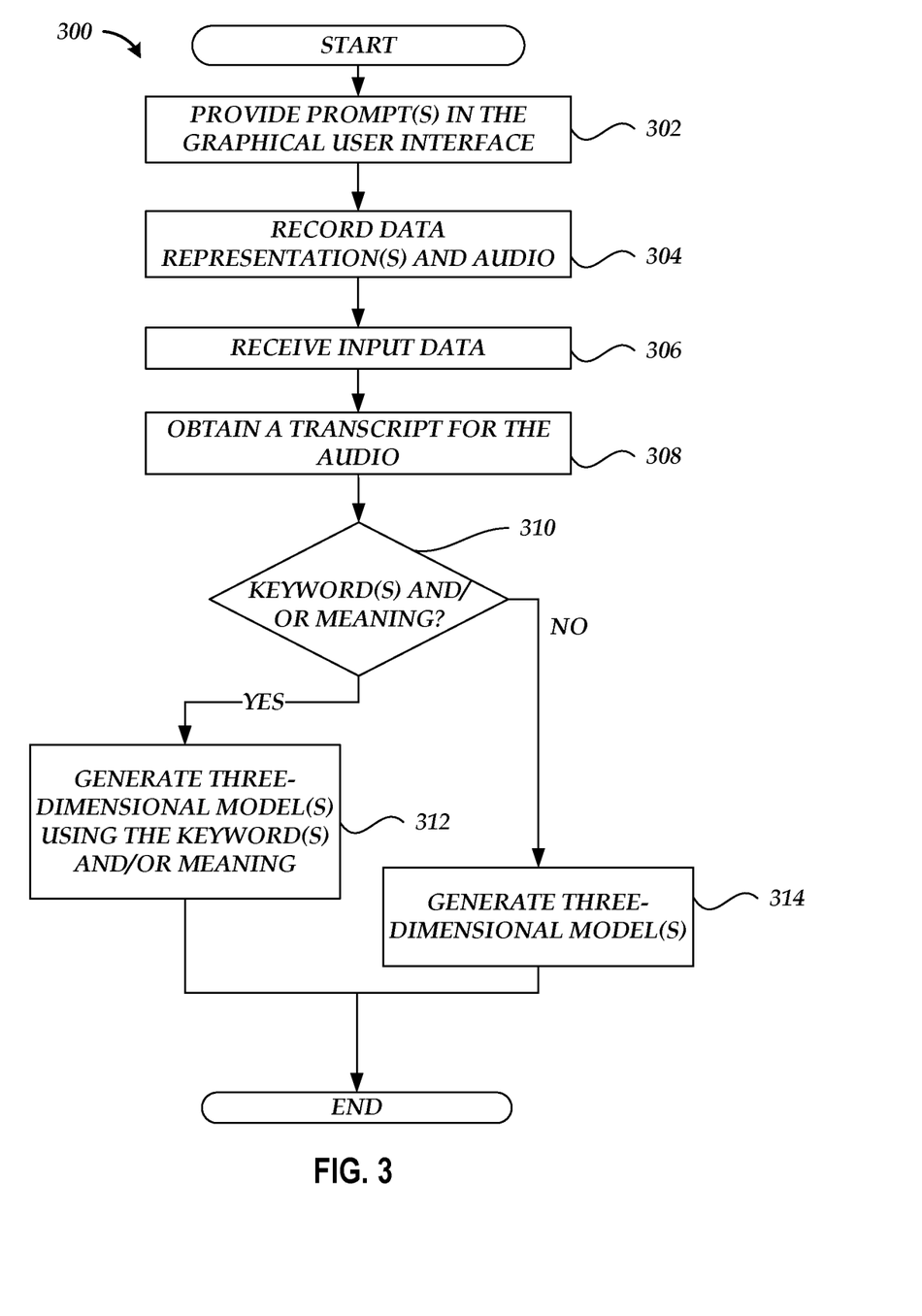
FIG. 3 is a flow diagram depicting an example method for generating a three-dimensional model of a physical space using audio data.

FIG. 3 is a flow diagram depicting an example method 300 implemented by the user computing device 201 and/or the modeling system 250 for generating a three-dimensional model of a physical space using a transcript. As described herein, the modeling system 250 may include the computing devices 230, 270. In some embodiments, the user computing device 201 may include the capture application 215 and the computing devices 230, 270 may include the speech-to-text component 260, the natural language understanding component 266, and the modeling application 272, each of which may implement aspects of the method 300.

Beginning at block 302, one or more prompts can be provided in a graphical user interface. For example, the capture application 216 of the user computing device 201 can include a graphical user interface. The capture application 216 of the user computing device 201 can prompt the user to speak and describe the physical space during the user controlled scanning and/or recording. In some embodiments, the capture application 216 can display a text prompt and/or output audio instructions via a speaker. Thus, the user can be encouraged to describe objects in the physical space. The user can be prompted to utter any of the following example phrases while recording. "This is the door." "This is the television stand, I think I want to keep it." "This is a couch, but it is old and I might consider replacing it in the next few months." "I really like this side table, and I would like whatever couch I buy to match the side table, or to go well with the side table." "I like this lamp." "These are the east facing bay windows in the room, which let in a lot of light." Advantageously, the prompt(s) can naturally cause the user to better frame objects while scanning/recording the physical space. For example, a physical space can include what might look like a long window in a corner of a room, but it may instead be a doorway to the patio. By prompting the user to describe objects in the physical space, the user may be caused to come closer to the doorway to the patio while describing, scanning, and/or recording the doorway, which can allow the systems and methods described herein to identify the doorway with a higher likelihood of success than without the better framing and/or the user's narration of the doorway.

At block 304, digital representation(s) of a physical space and audio can be recorded. For example, the capture application 216 of the user computing device 201 can record digital representation(s) of the physical space and audio. As described herein, during recording, a user can point their user computing device 201 around a physical space and describe the space. Also as described herein, example digital representations can include, but are not limited to, a video and/or a point cloud. A lidar sensor (described above with respect to the input/output device 218 of FIG. 2) of the user computing device 201 emits pulsed light waves into the surrounding environment and the pulses bounce off surrounding objects and return to the sensor, and the capture application 216 can record the resulting scan. An example scan can include a collection of points that represent three-dimensional shapes, which can be referred to herein as a "point cloud." In some embodiments, the scan can represent an overall shape of the room where the recording occurred. The capture application 216 can record a video using a camera (described above with respect to the input device 218 of FIG. 2) of the user computing device 201. The capture application 216 can record audio using a microphone (described above with respect to the input device 218 of FIG. 2) of the user computing device 201. Each of the digital representation(s) and the audio can be associated with timestamps, and the timestamps can generally be synchronized. Each frame extracted from the video is associated with a timestamp. Each point of the point cloud is associated with a timestamp. In some embodiments, the capture application 216 may support user recording of audio at a separate time from the recording of the digital representation(s); however, the user narration of the physical space may be recorded during playback of the digital representation recording(s), which would allow synchronization between the audio and the digital representation(s).

At block 306, input data can be received. For example, the modeling system 250 can receive the input data from the user computing device 201. As described herein, example input data can include digital representation(s) of the physical space and the audio data. As described herein, in some embodiments, at least some of the digital representation(s) and the audio data were synchronously captured by the user computing device 201. In some embodiments, example input data can include both (i) a first digital representation of the physical space (such as a video) and (ii) a second digital representation of the physical space (such as a point cloud).

At block 308, a transcript can be obtained for the audio data. For example, the computing device 230 of the modeling system 250 can generate the transcript from the audio data. As described herein, the speech-to-text component 260 may transcribe the audio data into text data representing the words of the speech contained in the audio data. The speech-to-text component 260 may interpret an utterance based on the similarity between the utterance and pre-established language models. For example, the speech-to-text component 260 may compare the input audio data with models for sounds (e.g., sub-word units or phonemes) and sequences of sounds to identify words that match the sequence of sounds spoken in the utterance of the audio data. The generated transcript can be associated with timestamp data. The speech-to-text component 260 can generate transcript metadata that indicates a timestamp for textual content within the transcript. For example, the generated transcript metadata can indicate a timestamp for each of word of the transcript, and/or start and end timestamps for portions of the textual content (such as a phrase, a sentence, a line, or groups of sentences) of the transcript. Obtaining the transcript can include receiving or generating the transcript. The modeling system 250 can obtain or receive the transcript whether or not the modeling system 250 specifically requested the transcript. For example, the modeling system 250 can receive a transcript for the audio data from a transcript service external to the modeling system 250.

At block 310, it can be determined whether one or more keywords and/or user meaning(s) are present in the transcript. For example, the natural language understanding component 266 of the computing device 230 can identify a keyword and/or a user meaning (such as user intent and/or sentiment) from the transcript. In particular, the natural language understanding component 266 can identify a keyword by comparing a word from the transcript with keywords from a keyword dictionary. Word comparison need not be exact and the natural language understanding component 266 can apply fuzzy word matching in some embodiments. For example, the natural language understanding component 266 can identify keywords, such as, but not limited to, "window," "door," "staircase," "couch," "table," "book case," "lamp," etc., in the transcript. As described herein, a keyword from the transcript can be associated with a timestamp that corresponds to the approximate time when the keyword was uttered by the user. If it is determined that a keyword and/or user meaning has been identified from the transcript, then the method 300 can proceed to the block 312 for generating a three-dimensional model using at least the keyword and/or the user meaning. Otherwise, the method 300 can proceed to the block 314 for generating a three-dimensional model without the keyword and/or the user meaning.

The natural language understanding component 266 can identify user meaning (such as user sentiment or user intent) from the transcript. For example, the natural language understanding component 266 can identify a category associated with an identified keyword. Example categories can include (i) a first category indicating a likely intent for removal or replacement of an object associated with the keyword, or (ii) a second category indicating a likely intent to keep the object associated with the keyword. Example words or phrases for the first category can include, but are not limited to, "get rid of," "remove," "recycle," "old," "bad," "ugly," "dislike," "replace," etc. Example words or phrases for the second category can include, but are not limited to, "keep," "favorite," "good," "nice," "like," etc. If the category words and/or a variation thereof are determined by the natural language understanding component 266 as being within a threshold period of time from identification of the keyword, then the natural language understanding component 266 can associate the determined user meaning with the keyword. For example, the natural language understanding component 266 can determine from the transcript that a user would like to keep, remove, or replace a couch.

At block 314, one or more three-dimensional models can be generated. For example, the modeling application 272 of the computing device 270 can generate one or more three-dimensional models from the digital representations and without any keywords or user meaning since those items were not identified in the transcript. In some embodiments, the modeling application 272 can generate a three-dimensional model of the overall shape of a space using the scan data, which can be from a lidar sensor. For example, there are a number of software packages that can convert scan data (such as a point cloud) to a three-dimensional model. The modeling application 272 can provide the scan data (such as a point cloud) to a library and receive a three-dimensional model as output from the library. In some embodiments, the modeling application 272 can generate a three-dimensional model from video data. Example output formats for the three-dimensional model can include, but are not limited to, glTF and USDZ. The modeling application 272 can use a generic machine learning model (such as a classifier) for general object identification as applied to at least a portion of the digital representation of the physical space. However, as described herein, the presence of keyword(s) and/or user meaning in the transcript can be used by the modeling application 272 to enhance the output three-dimensional model.

At block 312, one or more three-dimensional models can be generated using keyword(s). For example, the modeling application 272 of the computing device 270 can generate one or more three-dimensional models from the digital representation(s) by using the keywords and/or user meaning identified at a previous block. The block 312 for generating three-dimensional models using the keywords and/or user meaning can be similar to the block 314 for generically generating a three-dimensional model. For example, the modeling application 272 can generate a three-dimensional model of the overall shape of a space using the digital representation(s) (such as scan data), object identification can be performed on the digital representation(s) (such as scan and/or video data), and example output formats for the three-dimensional model can include, but are not limited to, glTF and USDZ. However, in addition to the common steps of the block 314 for generically generating a three-dimensional model, the modeling application 272 can use specific steps applying the one or more identified keywords. Additional details related to generating a three-dimensional model using the one or more identified keywords are provided below with respect to the method 400 of FIG. 4.

In some embodiments, the modeling application 272 can generate multiple three-dimensional models for the same physical space. For example, the modeling application 272 can generate a first three-dimensional model that is an empty shell (such as an empty room shell), a second three-dimensional model with multiple objects and excluding objects that a user has indicated should be removed or replaces, and/or a third three-dimensional model with replacement objects (which can also be referred to as up-sell items).

In some embodiments, the modeling application 272 can further generate a three-dimensional model based at least in part on identified user meaning. For example, the modeling application 272 can determine, from at least some words from the transcript, a likely user intent associated with the keyword, where the likely user intent indicates a likely intent to remove, replace, or keep the object. For example, the user can utter any of the following speech. "This is the television stand, I think I want to keep it." "This is a couch, but it is old and I might consider replacing it in the next few months." "I don't like this lamp, I want to get rid of it." Accordingly, in some embodiments, the modeling application 272 can create metadata that both identifies the object in the three-dimensional model and includes an indication of the likely intent to remove, replace, or keep the object. In other embodiments, based at least in part on the likely user intent to remove, replace, or keep the object, the modeling application 272 can either remove or include the object in the three-dimensional model. As described herein, in some embodiments, the modeling application 272 can generate a second three-dimensional model that corresponds to the first three-dimensional model and that includes a second object at a location where the first object (indicated for removal or replacement) was located, which can be referred to herein as up-selling.

Figure 4:
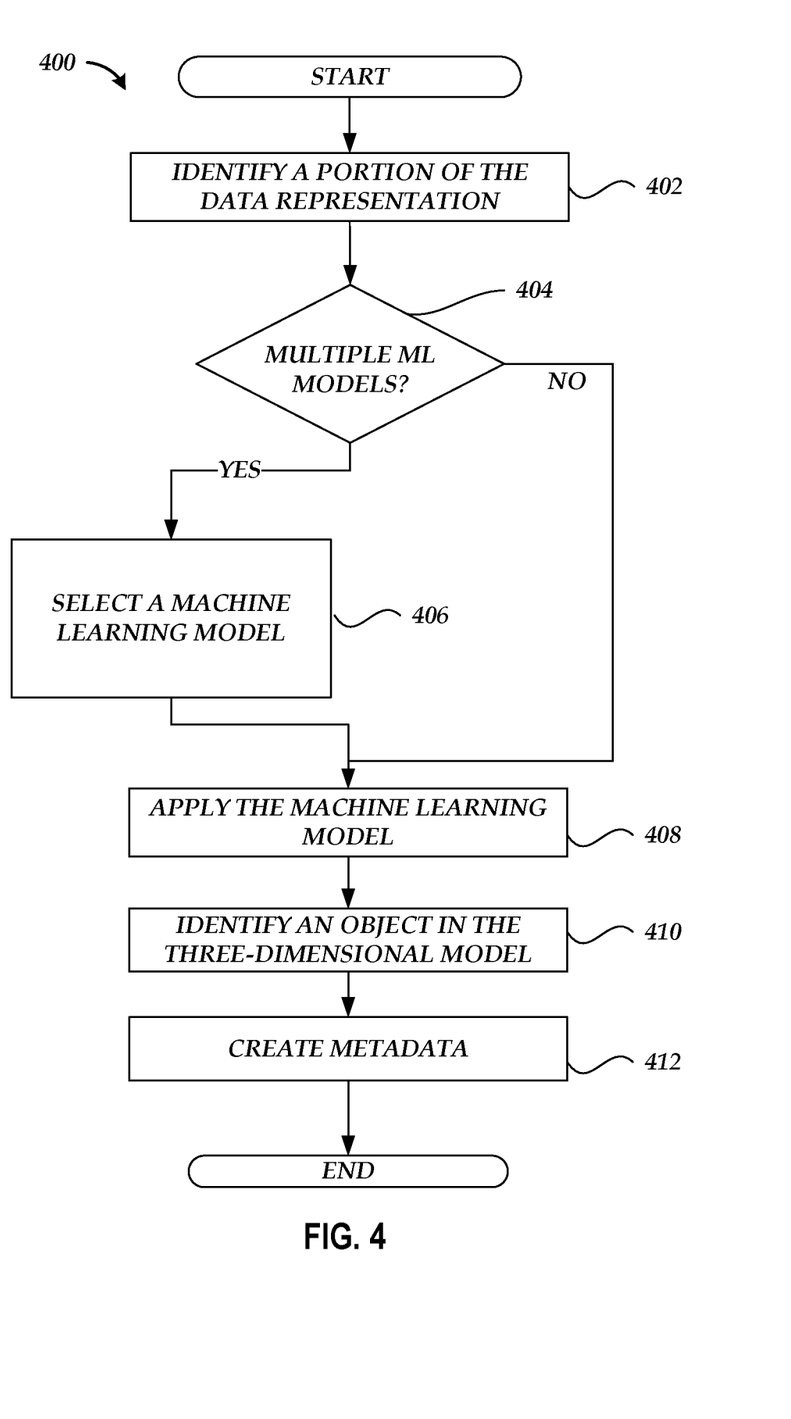
FIG. 4 is a flow diagram depicting another example method with additional details for generating a three-dimensional model.

FIG. 4 is a flow diagram depicting another example method 300 implemented by the user computing device 201 and/or the modeling system 250 for generating a three-dimensional model. As described herein, the modeling system 250 may include the computing devices 230, 270. In some embodiments, the computing devices 230, 270 may include the speech-to-text component 260, the natural language understanding component 266, and the modeling application 272, each of which may implement aspects of the method 300.

Beginning at block 402, a portion of the digital representation (such as the video or the point cloud) can be identified. For example, the modeling application 272 can identify a portion of the digital representation(s) based at least in part on matching respective timestamps associated with the keyword and the portion of the digital representation(s). As described herein, the keyword is associated with a timestamp when the keyword was approximately uttered. The modeling application 272 can identify a portion of a video by identifying a set of frames within a threshold period of time (such as within three seconds) of the video as synchronized with the timestamp of the keyword. Thus, the modeling application 272 can process a portion of the video that has a high possibility of including an object of interest as indicated by the detected speech utterance and keyword. In a similar manner, the modeling application 272 can identify a set of points from a point cloud (where each point in the point cloud can be associated with a timestamp) within a threshold period of time (such as within three seconds) synchronized with the timestamp of the keyword.

At block 404, it can be determined whether there are multiple machine learning models for selection. For example, the modeling application 272 can determine whether there are multiple machine learning models for selection. In some embodiments, there can be multiple machine learning models and each of the machine learning model can be directed towards identifying a particular type of object (such as, but not limited to, a type of furniture, a window, a door, a staircase, etc.). In some cases, the modeling application 272 can be configured to use one of multiple machine learning models. If there are multiple machine learning models for selection, the method 400 can proceed to the next block 406 to select a machine learning model. In some embodiments, the modeling application 272 can determine that there is a single machine learning model to use, such as where the machine learning model can receive the keyword as input and identify an object based on the keyword input. The modeling application 272 can determine to use a single machine learning model based on configuration. Thus, if there are not multiple machine learning models to use, the method 400 can skip the selection step and proceed directly to the block 408 for applying the machine learning model.

At block 406, a machine learning model can be selected. For example, the modeling application 272 can select, from multiple machine learning models, a specific machine learning model based at least in part on the keyword. As described herein, instead of using a generic machine learning model, the modeling application 272 can, after detecting a specific keyword (such as a "couch"), select a specific machine learning model corresponding to the keyword (such as a couch specific machine learning model). An example machine learning model can include a neural network, such as a convolutional neural network (CNN). A type of machine learning model can include a detector type. A detector can both detect an object in an image or point cloud (with a percentage degree of certainty in some embodiments) and create a bounding box in the image or point cloud identifying the object. Another example machine learning model type can include a segmenter type. An example segmenter can output a segmentation mask that associates a respective label with a pixel (and potentially associate a respective label with every pixel) from a frame of the portion of the video. However, if the input to the machine learning model was a portion of the point cloud, the segmenter can generate a segmentation mask that associates a respective label with a point (and potentially associate a respective label with every point) from the portion of the point cloud. Another example machine learning model type can include a classifier type. A classifier can detect an object in an image or point cloud (with a percentage degree of certainty in some embodiments). Thus, an example machine learning model can identify objects. An example machine learning model can include at least one of a neural network, a classifier, a detector, or a segmenter. Another example machine learning model can identify textures, such as the texture of the wall or floor. The modeling application 272 can include the texture in the three-dimensional model.

At block 408, the machine learning model can be applied. For example, the modeling application 272 can apply a machine learning model to the portion of the video or the portion of the point cloud based at least in part on the keyword. Applying the machine learning model can result in model output. For example, the modeling application 272 can apply the specifically identified machine learning model (such as a couch-specific machine learning model) to the portion of the video or the portion of the point cloud, where applying the specific classifier to the input data results in model output. Example model output can include a probability that a specific object is present in the portion of the video or the point cloud.

In another example, depending on the type of machine learning model used, the modeling application 272 can convert the keyword to model input (such as input in a binary vector format). The modeling application 272 can provide (i) the model input and (ii) the portion of the digital representation to the machine learning model as input; and the modeling application 272 can receive model output from the machine learning model. Example model output can include a segmentation mask. For example, if the input to the machine learning model was a portion of a video, then the segmentation mask can associate a respective label with a pixel (and potentially associate a respective label with every pixel) from a frame of the portion of the video. Similarly, if the input to the machine learning model was a portion of a point cloud, then the segmentation mask can associate a respective label with a point (and potentially associate a respective label with every point) from the portion of the point cloud. Example labels can include object names and/or identifying features of the physical space, such as, but not limited to, "wall," "door," "couch," "window," "staircase," etc. Example model output can also include multiple output probabilities, where each probability can indicate a likelihood (such as a percentage likelihood) that a respective object is present in the portion of the digital representation. Thus, the modeling application 272 can select the object associated with the highest probability from the multiple probabilities of the model output, and the modeling application 272 can include the selected object in the three-dimensional model.

At block 410, an object can be identified in the three-dimensional model. For example, the modeling application 272 can identify an object in the three-dimensional model based at least in part on the model output. For example, if there is a greater than 50%, 60%, 70%, etc., chance that the object (such as a couch) is present in the three-dimensional model, then the machine learning model 272 can identify the object in the three-dimensional model. Conversely, if the model output probability is less than a threshold value, the modeling application 272 may not identify an object in the three-dimensional mode. In some embodiments, the modeling application 272 can locate an object in the three-dimensional model based at least in part on the model output. As described herein, the machine learning model can include a detector or a segmenter and the model output can locate the object in at least a portion of the digital representation.

At block 412, metadata can be created. For example, the modeling application 272 can create metadata that identifies the object in the three-dimensional model. As described herein, if there is a greater than 50%, 60%, 70%, etc., chance that the object (such as a couch) is present in the three-dimensional model, then the modeling application 272 can create metadata including an annotation describing the object (such as "couch" text) and information identifying the object in the three-dimensional model. In some embodiments, the modeling application 272 can create metadata that locates the object in the three-dimensional model.

In some embodiments, the annotation can include user-customized text. For example, since the user may provide a description of the object as user input (such as "the green couch"), then the modeling application 272 can include the user-customized descriptive input in an annotation, which can be provided back to the user at a later time, such as by presented in a graphical user interface along with presentation of the three-dimensional model.

In some embodiments, the metadata identifying objects in the three-dimensional model can include or be an index. Accordingly, a user can search for objects in the three-dimensional model using the index and a corresponding graphical user interface. In some embodiments, the user computing device 201 can perform automatic speech recognition and/or modeling locally. For example, the user computing device 201 can perform automatic speech recognition and/or modeling substantially in real-time while the user is interacting with the user computing device 201. The machine learning models described herein can be stored on the user computing device 201. Accordingly, the graphical user interface of the capture application 216 can highlight (such as visually highlighting with a color and/or a crosshair image) object(s) in the display of the user computing device 201 as the user is pointing the camera of the user computing device 201 at the object in the physical space and potentially describing the object at the same time. This type of feedback can be useful to users as the user scans and/or records the physical space.

While room modeling, interior design, and furniture are used as examples within the present disclosure, it will be appreciated that the systems and techniques described herein can be applied to other contexts. An additional example environment can include the clothing environment. A user can use augmented or virtual reality with clothing or any wearable, and a user could use their user computing device 201 to scan objects in a clothing or an eyeglass store while narrating those items, which could be detected using the audio in conjunction with computer vision. As another example, the interior of a factory could be scanned and narrated with audio data to generate a three-dimensional representation of the factory or components within the factory.

While lidar data, scanning, and point clouds are used as an example throughout the present disclosure, it will be appreciated that some embodiments described herein can omit lidar scanning and using lidar scan data. For example, the systems and techniques described herein can generate three-dimensional models based on video and audio data without using lidar data and/or a point cloud.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The term "substantially" when used in conjunction with the term "real-time" forms a phrase that will be readily understood by a person of ordinary skill in the art. For example, it is readily understood that such language will include speeds in which no or little delay occurs.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for generating a representation of a physical environment comprising:
   under control of a computer hardware processor configured with specific computer executable instructions,
      receiving, from a user computing device, input data including (i) a first digital representation of a physical space, wherein each discrete unit extracted from the first digital representation represents a portion of the physical space and is associated with a first timestamp, and (ii) audio data, wherein at least some of the first digital representation and the audio data were synchronously captured by the user computing device;
      generating a transcript from the audio data;
      identifying a keyword from the transcript associated with a second timestamp;
      selecting, from a plurality of machine learning models, a machine learning model based at least in part on the keyword, wherein the machine learning model is trained to locate an object that corresponds to the keyword in at least a portion of a digital representation; and
      generating a three-dimensional model of the physical space from at least the first digital representation, wherein generating the three-dimensional model further includes:
         identifying a first portion of the first digital representation based at least in part on matching the second timestamp with the first timestamp;
         applying the machine learning model to the first portion of the first digital representation, wherein applying the machine learning model results in model output;
         locating an object in the three-dimensional model based at least in part on the model output; and
         creating metadata that locates the object in the three-dimensional model.

2. The computer-implemented method of claim 1, wherein the metadata includes an annotation that describes the object.

3. The computer-implemented method of claim 1, wherein (i) the first digital representation includes a video and (ii) the discrete unit includes a frame, and wherein identifying the first portion of the first digital representation further comprises:
   identifying a plurality of frames within a threshold period of time of the video synchronized with the second timestamp.

4. The computer-implemented method of claim 1, wherein (i) the first digital representation includes a point cloud and (ii) the discrete unit includes a point, and wherein the point cloud is generated from a lidar sensor of the user computing device.

5. The computer-implemented method of claim 1, wherein identifying the keyword from the transcript further comprises:
   comparing a first word from the transcript with a plurality of keywords from a keyword dictionary.

6. The computer-implemented method of claim 1, wherein the machine learning model includes at least one of a neural network, a classifier, a detector, or a segmenter.

7. A system comprising:
   a non-transitory data storage medium; and
   a computer hardware processor in communication with the non-transitory data storage medium, wherein the computer hardware processor is configured to execute computer-executable instructions to at least:
      receive, from a user computing device, input data including (i) a first digital representation of a physical space, wherein each discrete unit extracted from the first digital representation is associated with a first timestamp, and (ii) audio data;
      obtain a transcript for the audio data;
      identify a keyword from the transcript associated with a second timestamp;
      select, from a plurality of machine learning models, a machine learning model based at least in part on the keyword, wherein the machine learning model is trained to identify an object that corresponds to the keyword in at least a portion of a digital representation; and
      generate a first three-dimensional model of the physical space from at least the first digital representation, wherein to generate the first three-dimensional model, the computer hardware processor is configured to execute the computer-executable instructions to at least:
         identify a first portion of the first digital representation based at least in part on matching the second timestamp with the first timestamp;
         apply the machine learning model to the first portion of the first digital representation;
         receive model output from the machine learning model; and
         identify a first object in the first digital representation based at least in part on the model output.

8. The system of claim 7, wherein the computer hardware processor is configured to execute further computer-executable instructions to at least:
   determine, from at least some words from the transcript, a likely user intent associated with the keyword, wherein the likely user intent indicates a likely intent for removal or replacement of the first object.

9. The system of claim 8, wherein to generate the first three-dimensional model, the computer hardware processor is configured to execute additional computer-executable instructions to at least:
   create metadata that identifies the first object in the first three-dimensional model, wherein the metadata further includes an indication of the likely intent for the removal or replacement of the first object.

10. The system of claim 8, wherein to generate the first three-dimensional model, the computer hardware processor is configured to execute additional computer-executable instructions to at least:

remove the first object from the first three-dimensional model.

11. The system of claim 10, wherein the computer hardware processor is configured to execute supplemental computer-executable instructions to at least:
generate a second three-dimensional model that corresponds to the first three-dimensional model, wherein to generate the second three-dimensional model, the computer hardware processor is configured to execute the supplemental computer-executable instructions to at least:
insert, into the second three-dimensional model, a second object at a location where the first object was located.

12. The system of claim 7, wherein (i) the first digital representation includes a video and (ii) the discrete unit includes a frame, wherein the input data includes a point cloud of the physical space, and wherein to generate the first three-dimensional model, the computer hardware processor is configured to execute further computer-executable instructions to at least:
provide the point cloud to a library; and
receive the three-dimensional model from the library based at least in part on the point cloud.

13. The system of claim 12, wherein to identify the first portion of the first digital representation, the computer hardware processor is configured to execute further computer-executable instructions to at least:
identify a plurality of frames within a threshold period of time of the video synchronized with the second timestamp.

14. A system comprising:
a non-transitory data storage medium; and
a computer hardware processor in communication with the non-transitory data storage medium, wherein the computer hardware processor is configured to execute computer-executable instructions to at least:
receive, from a user computing device, input data including (i) a first digital representation of a physical space, wherein each discrete unit extracted from the first digital representation is associated with a first timestamp, and (ii) audio data;
obtain a transcript for the audio data;
identify a keyword from the transcript associated with a second timestamp; and
generate a three-dimensional model of the physical space from at least the first digital representation, wherein to generate the three-dimensional model, the computer hardware processor is configured to execute the computer-executable instructions to at least:
identify a first portion of the first digital representation based at least in part on matching the second timestamp with the first timestamp;
apply a machine learning model to the first portion of the first digital representation based at least in part on the keyword, wherein the machine learning model is trained to identify an object that corresponds to the keyword in at least a portion of a digital representation;
receive model output from the machine learning model; and
identify a first object in the first digital representation based at least in part on the model output.

15. The system of claim 14, wherein to apply the machine learning model, the computer hardware processor are configured to execute further computer-executable instructions to at least:
convert the keyword to model input; and
provide (i) the model input and (ii) the first portion of the first digital representation to the machine learning model as input.

16. The system of claim 15, wherein the model output includes a plurality of probabilities, each probability of the plurality of probabilities indicating a likelihood that a respective object is present in the first portion of the first digital representation, wherein to identify the first object, the computer hardware processor is configured to execute additional computer-executable instructions to at least:
select a highest probability from the plurality of probabilities, wherein the highest probability is associated with the first object.

17. The system of claim 15, wherein (i) the first digital representation includes a video and (ii) the discrete unit includes a frame, wherein the model output includes a segmentation mask, the segmentation mask associates a label with a pixel from the frame.

18. The system of claim 14, wherein the computer hardware processor is configured to execute further computer-executable instructions to at least:
determine, from at least some words from the transcript, a likely user intent associated with the keyword, wherein the likely user intent indicates a likely intent to keep the first object.

19. The system of claim 18, wherein to generate the three-dimensional model, the computer hardware processor is configured to execute additional computer-executable instructions to at least:
create metadata that identifies the first object in the three-dimensional model, wherein the metadata further includes an indication of the likely intent to keep the first object.

20. The system of claim 18, wherein to generate the three-dimensional model, the computer hardware processor is configured to execute additional computer-executable instructions to at least:
include the first object in the three-dimensional model.

* * * * *